(12) United States Patent
Barth et al.

(10) Patent No.: US 10,459,881 B2
(45) Date of Patent: Oct. 29, 2019

(54) DATA MANAGEMENT PLATFORM USING METADATA REPOSITORY

(71) Applicant: Podium Data, Inc., Lowell, MA (US)

(72) Inventors: Paul S. Barth, Lexington, MA (US);
Atif Majid, Lexington, MA (US);
Robert Vecchione, Chelmsford, MA (US); Michael T. Howard, Cape Elizabeth, ME (US)

(73) Assignee: Podium Data, Inc., Lowell, MA (US)

( * ) Notice: Subject to any disclaimer, the term of this patent is extended or adjusted under 35 U.S.C. 154(b) by 196 days.

(21) Appl. No.: 14/633,703

(22) Filed: Feb. 27, 2015

(65) Prior Publication Data

US 2016/0253340 A1    Sep. 1, 2016

(51) Int. Cl.
*G06F 17/20* (2006.01)
*G06F 16/11* (2019.01)
*G06F 16/13* (2019.01)
*G06F 16/14* (2019.01)
*G06F 16/182* (2019.01)

(52) U.S. Cl.
CPC ............ *G06F 16/122* (2019.01); *G06F 16/13* (2019.01); *G06F 16/148* (2019.01); *G06F 16/182* (2019.01)

(58) Field of Classification Search
CPC ..................... G06F 17/30082; G06F 17/30091
See application file for complete search history.

(56) References Cited

U.S. PATENT DOCUMENTS

| | | | |
|---|---|---|---|
| 8,688,660 B1* | 4/2014 | Sivasubramanian | G06F 3/0619 707/703 |
| 8,978,034 B1* | 3/2015 | Goodson | G06F 17/30466 718/101 |
| 2008/0162521 A1* | 7/2008 | Browning | G06F 21/6227 707/999.101 |
| 2011/0191361 A1 | 8/2011 | Gupta et al. | |
| 2013/0124483 A1 | 5/2013 | Furuhashi et al. | |
| 2014/0201190 A1* | 7/2014 | Ebenstein | G06F 17/30451 707/722 |
| 2015/0032477 A1* | 1/2015 | Duncan | G06Q 30/04 705/3 |

* cited by examiner

*Primary Examiner* — Khanh B Pham
(74) *Attorney, Agent, or Firm* — David H. Judson

(57) ABSTRACT

An analytical computing environment for large data sets comprises a software platform for data management. The platform provides various automation and self-service features to enable those users to rapidly provision and manage an agile analytics environment. The platform leverages a metadata repository, which tracks and manages all aspects of the data lifecycle. The repository maintains various types of platform metadata including, for example, status information (load dates, quality exceptions, access rights, etc.), definitions (business meaning, technical formats, etc.), lineage (data sources and processes creating a data set, etc.), and user data (user rights, access history, user comments, etc.). Within the platform, the metadata is integrated with all platform services, such as load processing, quality controls and system use. As the system is used, the metadata gets richer and more valuable, supporting additional automation and quality controls.

20 Claims, 5 Drawing Sheets

DATA MANAGEMENT PLATFORM USING METADATA REPOSITORY

BACKGROUND

Technical Field

This application relates generally to secure, large-scale data storage and, in particular, to end-to-end data management.

Brief Description of the Related Art

"Big Data" is the term used for a collection of data sets so large and complex that it becomes difficult to process (e.g., capture, store, search, transfer, analyze, visualize, etc.) using on-hand database management tools or traditional data processing applications. Such data sets, typically on the order of terabytes and petabytes, are generated by many different types of processes.

Big Data has received a great amount of attention over the last few years. Big Data solutions provide for the processing petabytes of data with low administrative overhead and complexity. These approaches can leverage flexible schemas to handle unstructured and semi-structured data in addition to structured data. Typically, they are built on commodity hardware instead of expensive specialized appliances. They can also advantageously leverage data from a variety of domains, some of which may have unknown provenance. Apache Hadoop™ is a widely-adopted Big Data solution that enables users to take advantage of these characteristics. The Apache Hadoop framework allows for the distributed processing of Big Data across clusters of computers using simple programming models. It is designed to scale up from individual servers to thousands of machines, each offering local computation and storage. The Hadoop Distributed File System (HDFS) is a module within the larger Hadoop project and provides high-throughput access to application data. HDFS has become a mainstream solution for thousands of organizations that use it as a warehouse for very large amounts of unstructured and semi-structured data.

Over the last few years, Big Data technologies based on Hadoop have been gaining traction within the Fortune 500 IT technology stacks. The typical use cases involve data processing tasks. These tasks include: data archival, data "lake" (hub storage of multiple sources), and data transformations. More complex but less common applications include data preparation for advanced analytics and business intelligence and reporting. While the technology stack was conceived many years ago, this public domain software stack remains immature and frequently unstable. This is evident in the lack of business applications specifically geared towards novice technologists and business users, and the difficulty in leveraging data loaded onto the platform. Additionally, because the base technology, HDFS (a parallel file system) enables the loading of any type of data, whether schema-based or otherwise, these known solutions often have significant deficiencies with respect to data validation and quantification. Indeed, often a user may load bad data and not even be aware of it.

As further background, sourcing and preparing enterprise data is a complex, slow, and expensive process for most businesses, because data comes from many different systems with inconsistent data formats, data names, and business meaning. The process of extracting data, cleansing, standardizing, and distributing typically requires integrating and customizing many different tools and technologies.

There remains a need to provide big data users (e.g., data administrators, analysts and business users) with the ability to load and refresh data from many sources, to find, select and prepare data for analysis, and to otherwise manage large data sets more efficiently and in a scalable and secure manner.

BRIEF SUMMARY

An analytical computing environment for large data sets comprises a software platform for data management. The platform, which may operate in a cloud computing architecture as an infrastructure shared by enterprise users, provides various automation and self-service features to enable those users to rapidly provision and manage an agile analytics environment for their Big Data. To this end, the platform includes a metadata repository, which tracks and manages all aspects of the data lifecycle, including storage management, access controls, encryption, compression, automated view creation, data format changes, data lineage, and refresh processing. In one embodiment, all (or substantially all) data in the user's analytics environment is registered with the metadata repository, which preferably maintains various types of metadata including, for example, status information (load dates, quality exceptions, access rights, etc.), definitions (business meaning, technical formats, etc.), lineage (data sources and processes creating a data set, etc.), and user data (user rights, access history, user comments, etc.). Within the platform, the metadata is integrated with all platform services, such as load processing, quality controls and system use. In other words, preferably all service processes in the analytics environment are tracked in the metadata to facilitate data management. Further, preferably the metadata repository automatically updates and provides access for self-service integration, preferably through a graphical user interface (GUI) for analysts to help them find, select, and customize data for their analyses. The system tracks data lineage and allows analysts to collaborate effectively, e.g., documenting and sharing insights into data structure and content. As the system is used, the metadata gets richer and more valuable, supporting additional automation and quality controls.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 7 illustrates a representative page upon selection of an Entities tab;

FIG. 8 illustrates a representative page upon selection of a Fields tab, together with user selection of one of the rows, to expose lineage information about a data source.

DETAILED DESCRIPTION

Figure 1:
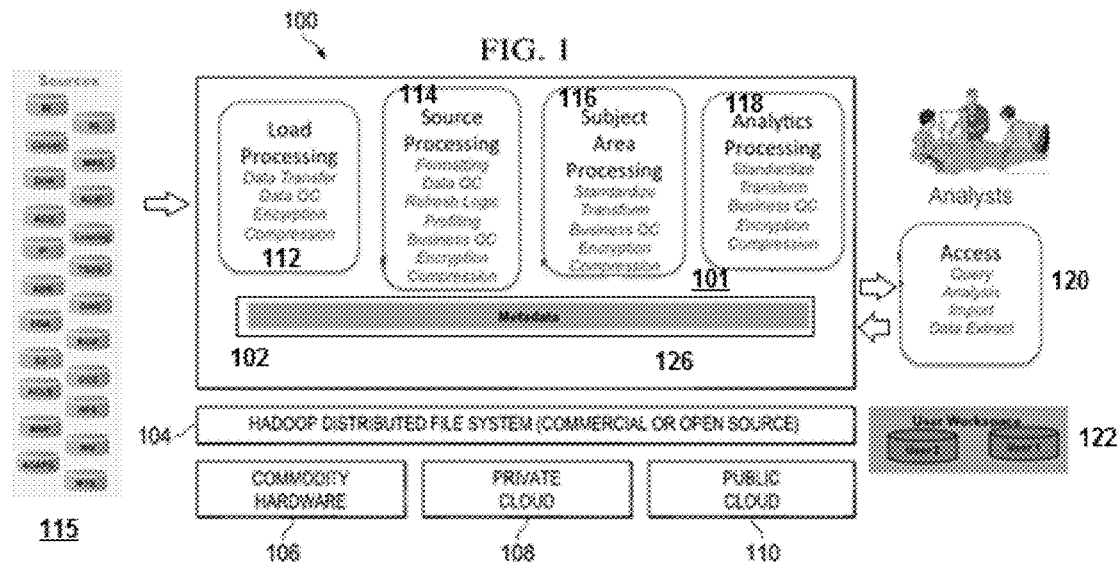
FIG. 1 depicts the data management platform architecture of this disclosure.

FIG. 1 depicts the data management platform of this disclosure. As will be described, at a high level the system 100 of this disclosure preferably comprises a data management server (which, in turn, comprises a set of platform services 101 components) that sit on top of metadata repository 102. The system 100 overlays a distributed file system 104, such as Hadoop Distributed File System (HDFS) cluster, which in turn executes in one or more distributed computing environments, illustrated by commodity hardware 106, private cloud 108 and public cloud 110. Generalizing, the bottom layer typically is implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud platform may comprise co-located hardware and software resources, or resources that are physically, logically, virtually and/or geographically distinct. Communication networks used to communicate to and from the platform services may be packet-based, non-packet based, and secure or non-secure, or some combination thereof.

The management platform of this disclosure may be configured as a hosted (cloud-based) service, as a Big Data appliance, or installed on an existing Big Data cluster. The platform provides users with an intuitive interface for acquiring, managing, quantifying and accessing data from any source system. Typically, the users are of two types: data consumers, who are authorized individuals that will want to browse the available data for use, e.g., in data preparation and analysis, and platform administrators, who are authorized individuals that are responsible for setting up load jobs, monitoring load jobs, administration, issue resolution, and the like.

As illustrated in FIG. 1, the management server platform preferably comprises several platform high level services 101. These services 101 are shown as distinct, but this is not a requirement, as one of more of the services may be combined with one another. In one embodiment, the services 101 comprise a load processing service 112, a source processing service 114, a subject area processing service 116, and an analytics processing service 118. Data sources 115 comprise various data sets that are available in the enterprise user's native data environments. These are the data sets that are to be loaded into and managed by the data management platform. At a high level, the services 112, 114, 116 and 118 illustrate how data is loaded, processed, and accessed across the data domains.

To this end, load processing service 112 provides for data transfer, data quality control, encryption and compression, and archival. Preferably, data is transferred from a source to a landing zone (an area of storage) in a process appropriate for the source. More generally, the landing zone is data storage where source data files are staged for loading into the system, and where an archive of data sources is maintained. In one embodiment, secure FTP (sFTP) is used for files from third data vendors and internal extract files. Load processing can also directly access relational data sources through JDBC or native interfaces. Preferably, the load process 112 checks the format and contents of data source files to ensure data sets are complete and consistent. If files have headers and trailers indicating record counts, these are validated, and the size of each record is compared to a metadata definition. Errors and inconsistencies are flagged, and offending records are stored for analysis and correction. Preferably, and as will be described in more detail below, the system uses encryption during transit and storage to protect the source data at all times. Preferably, source data being ingested into the system is compressed and encrypted in a single pass to optimize storage and I/O performance.

The source processing service 114 provides for formatting, application of data quality controls, refresh logic, profiling, business quality control, as well as encryption and compression. In particular, data from the landing zone preferably is formatted into UTF-8 or ASCII-compliant structures suitable for analytical processing, such and converting EBCDIC and packed decimal encodings to UTF-8 or ASCII standards. The values of the data fields, however, preferably are not modified. To control and validate data quality, preferably each record ingested is compared to a format specified in the metadata (and which may include custom patterns designed as regular expressions), which classifies the records into several categories, such as "good" (e.g., the record structure and data type of each field is consistent with the metadata), "bad" (e.g., the record structure does not conform to the metadata (e.g., the length or number of fields are incorrect), or "ugly" (e.g., the record structure is consistent, but data type of one or more fields does not match the metadata (e.g., alpha characters that are stored in a numeric field)). During this processing, errors and inconsistencies are flagged and offending records are stored for analysis and correction. During refresh, files that contain additions, updates, and deletions to the existing source data are applied to create a new source data file with these changes. Exceptions or errors in update logic are flagged for analysis and correction. Profiling involves analyzing all source data fields, with the results being stored in the metadata repository. Preferably, profiling involves a set of calculations that are performed "in-stream" while performing other source processing steps. These calculations include, without limitation: all fields: count of records, count of NULLs, Min, Max, and Frequency distribution of a given number of top values; Numeric Fields:Mean, Standard Deviation; String Fields: Leading/Trailing spaces, unprintable characters, min/max/average length. Business quality control typically involves applying rules that check the business consistency of the data. Typically, a rule is applied as appropriate to the data source, e.g., to check that the number of customers does not vary more than a given percent month-to-month. These rules may be customized to business requirements, and exceptions are flagged for analysis. This process preferably leverages a set of profiling statistics automatically computed and stored in the metadata. Preferably, both final and intermediate source data files are compressed and encrypted throughout processing and at rest. The source data files are stored in a source data repository and represent data sources that have had update/ refresh logic applied and whose data is formatted for querying and further processing.

The subject area processing service 116 performs data standardization and transformation. Preferably, business quality controls may be applied during this processing. During standardization, data records are selected, and fields are standardized to common data types, formats, and consistent values. For example, dates and numbers are converted to character string representations, strings are conformed to common character encoding sets, and key fields are trimmed to allow table joins. During transformation, data tables are joined, logic aggregates values across records, derived fields are computed, and records may be filtered. Preferably, the logic creating the subject area tables are developed to meet common analytical requirements. For example, a customer subject may be created by joining CRM, transactional, and retail data sources. Business quality control may be applied by this service, and preferably both final and intermediate source data files are compressed and encrypted throughout processing and at rest. The subject area processing enables commonly-used data to be integrated and organized by subject areas to facilitate user query and self-service. For example, the system may provide an integrated view of a data set containing dimensions and facts, and this data set may then be refreshed whenever the underlying source data is refreshed.

The analytics processing service 118 typically also involves standardization and transformations functions. In particular, preferably analytics data sets are tailored to support a specific type analysis, such as time-series records for predictive modeling. Analytics data sets may use data from subject areas, and, if needed from source data. These processes may be compute or I/O intensive, and preferably they take advantage of Big Data scalability to meet performance and functionality requirements. Analytic data sets are created by the analytics processing service to support more complex analyses and insights, such as time-series data needed to calculate persistence and adherence. These preprocessed data sets accelerate the analytics process and are automatically refreshed when the underlying data sources are refreshed.

As also illustrated in FIG. 1, the platform exposes various access services 120. These services include query, analysis, import and extract. In particular, preferably analysts use this service to query the data in the analytics platform in a number of ways. Preferably, all data in the analytics environment is accessible for direct query, e.g., via a HIVE interface, which supports native HQL (a subset of SQL) processing. In addition, most commercial Business Intelligence, analytics, and relational databases can access HIVE directly as a table, such as QlikView, R, SAS, Microstrategy, etc. This allows users to access and process their analytics environment data from a familiar tool or system. Note that while users typically only work with subject area and analytics data sets, preferably they are able to query the source data as well. This allows additional source data fields to be added quickly to an analysis. The analysis functionality, e.g., open-source analytics system R, preferably runs natively on the analytics platform. SaaS users can query data sets (such as analytics and subject areas) directly from their SaaS server. Many other analytics packages can run natively on the analytics platform, including Mahout (machine learning) and Datameer (data visualization). Advanced users can also develop high-performance MapReduce programs in Java, Scala, Python, and other languages. Further, using the access service, users are able to import data into their workspace directly, and later register data sets for automated processing, quality controls, and updates as described above. These data sets are registered in the metadata for integration with the other data sets on the platform. Using the extract function, data sets from the analytics platform may also be distributed to downstream systems for further processing, allowing results (such as model scores) to be automatically shared through other systems.

The above-described architecture and products are merely representative. More generally, the services may be supported on any relational/SQL-based system running on Hadoop or their equivalents.

As further seen in FIG. 1, the system may provide user workspace 122, which is dedicated storage on the platform to maintain working data sets, such as data a particular user selects or derives from source, subject area, and analytic data sets, external data being evaluated, and the like. If these data sets become useful for general use, they can be "promoted" to source, subject area, or analytic data areas with additional quality controls and automated refresh.

According to this disclosure, the end user (e.g., an enterprise customer of the data management platform) establishes an analytics environment using the above-described services to ingest and store their data. The source, subject area, analytic, and user data preferably are managed on a common platform and are available to analysts. This is in contrast to prior data warehouse schemes in which these categories of data often are stored in different schemas on different platforms, which limits their flexibility for analytic use. The analytics environment architecture as shown in FIG. 1 avoids these deficiencies and provides self-service features so an analyst can add new source data fields, e.g., by selecting and joining them to an existing data set.

FIG. 1 also illustrates the metadata repository 102, which stores platform metadata 126. Advantageously, the metadata repository 102 tracks and manages all aspects of the data lifecycle, including storage management, access controls, encryption, compression, automated view creation, data format changes, data lineage, and refresh processing. Preferably, all data in a user's analytics environment is registered with the metadata repository 102, which preferably maintains various types of metadata 126 including, for example, status information (load dates, quality exceptions, access rights, etc.), definitions (business meaning, technical formats, etc.), lineage (data sources and processes creating a data set, etc.), and user data (user rights, access history, user comments, etc.).

As used herein, the "platform" metadata is distinct from any basic (or "base") metadata that may be associated with a particular data source (or set of data) that is being managed by the platform.

Within the platform, and as illustrated, the platform metadata 126 underlies and thus is integrated with each of the load processing, source processing, subject area processing, analytics processing and other access services previously described. In other words, preferably all processes in the analytics environment are tracked in the platform metadata to facilitate data management. The platform metadata provides support to enable the platform user to identify the right data sources, develop analysis sets, manage versions of data sets, and trace the lineage of data processing and user access. Preferably, all processes in the analytics environment architecture are tracked in the metadata to automate processing, monitor status, and publish results. Further, and as described above, the metadata repository 102 supports self-service, preferably through a graphical user interface (GUI) for analysts to help them find, select, and customize data for their analyses. The system tracks data lineage and allows analysts to document and share insights with each other. As described above, and as the system is used, the user's associated metadata gets richer and more valuable, supporting additional automation and quality controls on the data.

Figure 2:
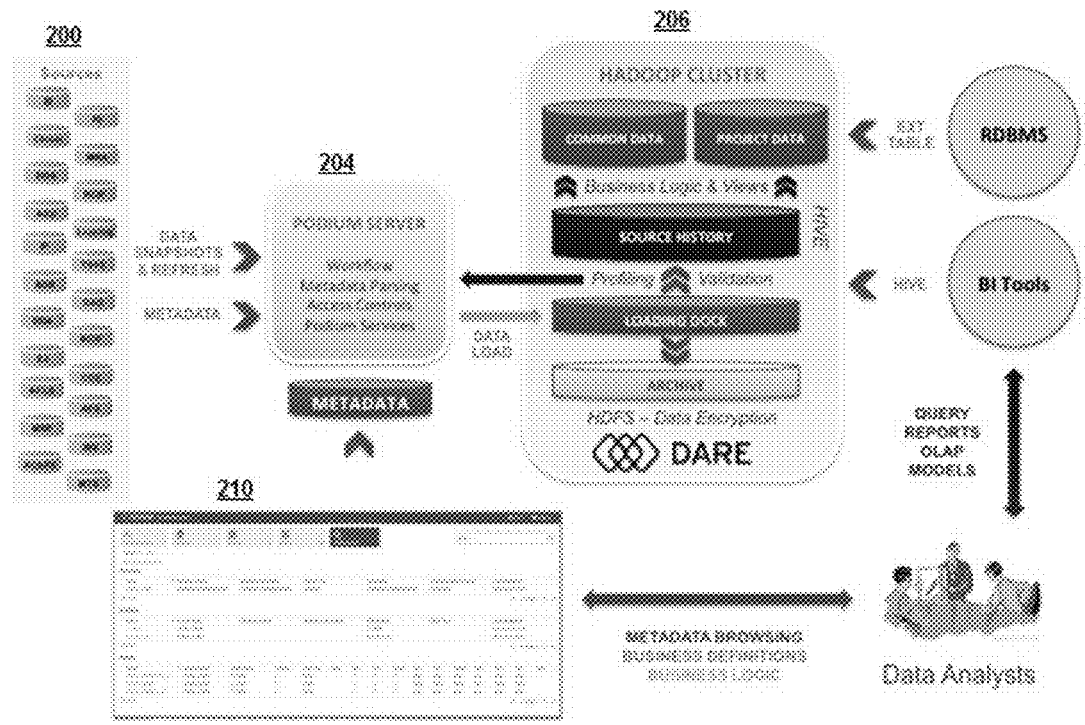
FIG. 2 depicts a technical architecture of the data management platform in one embodiment.

FIG. 2 depicts a representative technical architecture for the system. As illustrated, data sources 200 provide the data that is ingested into the system via the data management Podium™ server 204 (referred to as Podium™) and stored in the Hadoop cluster 206. The data sources provide the data management server 204 both the source data and associated metadata, and the data management server 204 provides the services previously described in the context of FIG. 1. The resulting platform system metadata 208 is stored in the metadata repository and is accessible to data analysts via a data management server graphical user interface (GUI) 210. The GUI typically is implemented as a set of pages (e.g., accessible over a secure Web link). Preferably, all data sets are stored and processed on the cluster 206 of Hadoop nodes, which nodes are managed by the data management server 204. The Hadoop nodes implement HDFS, a parallel file system. Preferably, the storage organizes source and derived data in HDFS directories, and this structure handles data versioning, quality control, file suspension, user workspaces, and the like. HDFS is used in association with encryption and compression to allow complete, historical archives to be securely and affordably available online for analysis. As noted above, the system's metadata database (the repository) resides or is otherwise accessible to the data management server 204, which also acts as a gateway for data transfer and access.

Without limitation, typically there are two distinct types of users: a data consumer, and a data management server administrator. The data consumer is a person authorized to "browse" the available data within the system (i.e., data to which visibility has been granted), for use in data preparation and analysis. The data management server administrator is responsible for setting up load jobs, monitoring load jobs, resolving technical issues, setting user permissions, etc.

Figure 3:
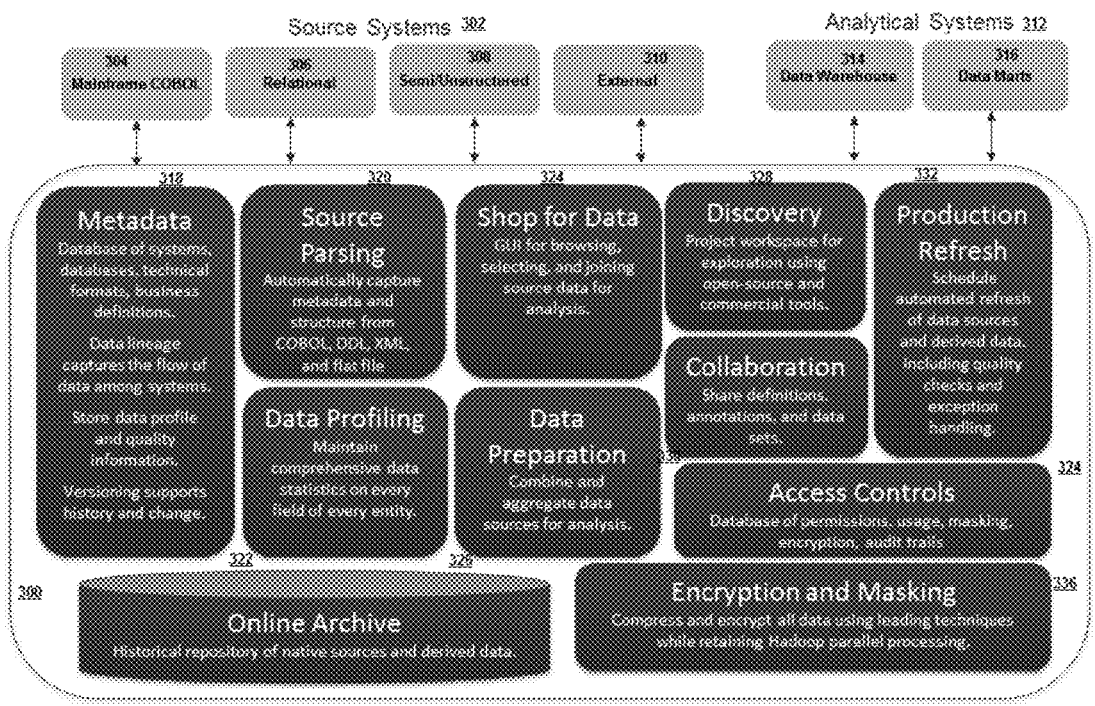
FIG. 3 depicts a set of components that comprise the data management server in one embodiment.

FIG. 3 illustrates the basic functional components of the data management server 300 in additional detail. These components, either singularly or in combination where appropriate, provide the platform services previously described. The data management server is shown as a single device or process, but this is not a limitation, as there may be multiple server instances, whether co-located or remote from one another. The functional components are shown as discrete components, but this is not a limitation, as one or more components may be integrated. As depicted, the platform server receives data from various source systems 302, such as mainframe (e.g., COBOL-based) 304, relational databases 306, semi/unstructured sources 308, and external data sources 310. The data output from the platform is stored in analytical systems 312, such as one or more data warehouses 314, and one or more data marts 316. The server platform components comprise the platform metadata component 318, which (as noted above) controls the metadata repository that tracks and manages all aspects of the data lifecycle, including storage management, access controls, encryption, compression, automated view creation, data format changes, data lineage, and refresh processing. The source parsing component 320 automatically parses many common business formats, such as COBOL/QSAM/VSAM, relational database DDL, flat files, and XML. Once parsed, the server automatically profiles data sources, flags data quality issues, presents data formats to users for search and query, and integrates business and technical metadata. The data profiling component 322 preferably leverages parallel processing techniques to compute comprehensive data profile statistics on every field of every entity. Profile data is used to identify quality issues and help users understand the meaning of the data. The data shopping component 324 uses a shopping cart-checkout metaphor to provide for an intuitive, interactive graphical interface that allows business users to search, browse, and select data for analysis and data processing. Using this component, users can add tags and definitions to data that the server platform can save and share for collaboration. While browsing data sources, users click on fields to add to their "cart." On checkout, the server automatically creates a view of the selected data for interactive query. The data preparation component 326 combines and aggregates data sources for analysis. Using the interface, the user can define common keys to join together data from legacy mainframes, relational databases, and custom flat files. This allows the platform to present an integrated view of data without changing source system formats. A discovery component 328 provides a project workspace that can be explored. The metadata-driven management allows new data to be loaded and explored in minutes. Analysts use data shopping to combine new and existing data into analytical data sets and integration processing to clean and standardize data. A collaboration component 330 enables sharing of definitions, annotations, and data sets. This component leverages metadata to provide several ways for users to annotate and organize fields and data sets, including via tags, annotations, and business/technical definitions. User comments on data that are shared provide a "knowledge network" of expert insights, encouraging reuse and accelerating insights. As noted above, the metadata system is designed for use by analysts, making it easy to annotate data with findings and insights during the course of analysis. Notes from experts on data sets and fields can be searched, shared, and amended allowing users to see who else has worked with a data source and best practices for using it. Over time, this collaborative curation captures expert knowledge and reinforces the understanding of available data assets among the analyst community.

The production/refresh component 332 schedules automated refresh of data sources and derived data including quality checks and exception handling. Using this component, new data created in the platform can be scheduled for production refresh and distribution with reprogramming or migration. The data refresh cycle includes data quality checks, data preparation processing, exception handling, and automated distribution.

The access controls component 334 provides an extensible framework for assigning users roles, groups, and permissions. These assignments, stored in the platform metadata, restrict access to data sets (or specific fields in a data set) and provide field-level masking and encryption. The encryption and masking component 336 provides that all data managed in the platform is or can be encrypted and/or masked to prevent inappropriate access to sensitive data. This may be performed at the file level, or at the field level within a data file. Using these tools/technologies, administrators can selectively manage what data is encrypted and which users have access.

Figure 4:
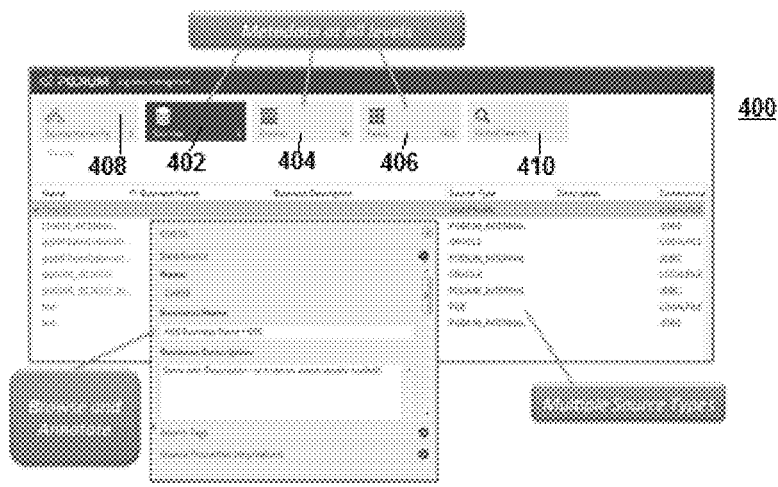
FIG. 4 depicts how a user creates an analysis data set using the graphical user interface (GUI) of the management server.

FIG. 4 illustrates how an end user creates an analysis data set. As depicted, the server platform provides a graphical user interface 400 that runs in a client (e.g., a web browser, or mobile device app, or the like) for searching, organizing, and preparing data for analysis. Preferably, data from all domains (source, subject area, analytics, and user workspace) are available to analysts (subject to access permissions). Preferably, data is organized by source 402, its entities (tables and files) 404, and the fields 406 in each entity. Metadata is maintained at each of these levels. In addition, users can organize the data in a source hierarchy folder structure 408. A source hierarchy is a logical grouping of data sources. For example, folders for a specific project can be logically grouped into folders for an analysis. The GUI allows users to search 410 data names, definitions, tags, and profile values to find the entities and fields used in an analysis. Preferably, every entity and field has a rich set of metadata, profile values, and sample data to ensure the analyst understands the structure and contents of the data, and comments from analysts who have previously used the data are retained and visible as well. The GUI 400 allows users to "shop for data" by checking fields to be included in the analysis data set. These fields then are added to a "cart" which collects them until checkout. At checkout, the server generates a given display view (e.g., an HQL view) of the analysis data set that the user can customize with filters, joins, and other selection criteria.

Display interface screens provide various user interfaces to facilitate user workflows using the system.

Figure 5:
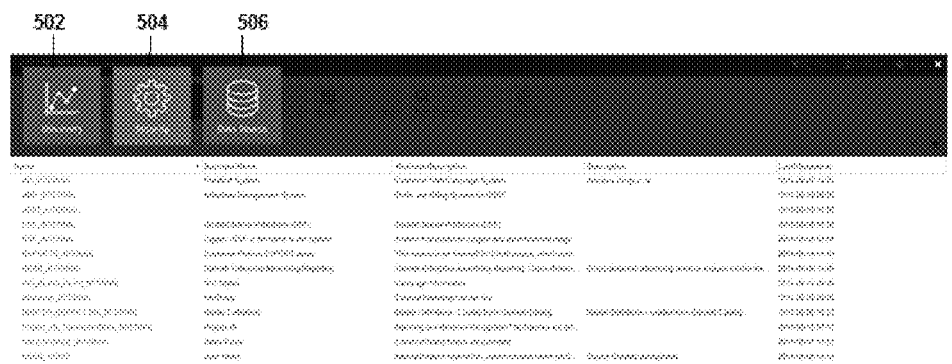
FIG. 5 depicts an initial display view from the management server interface.
Figure 6:
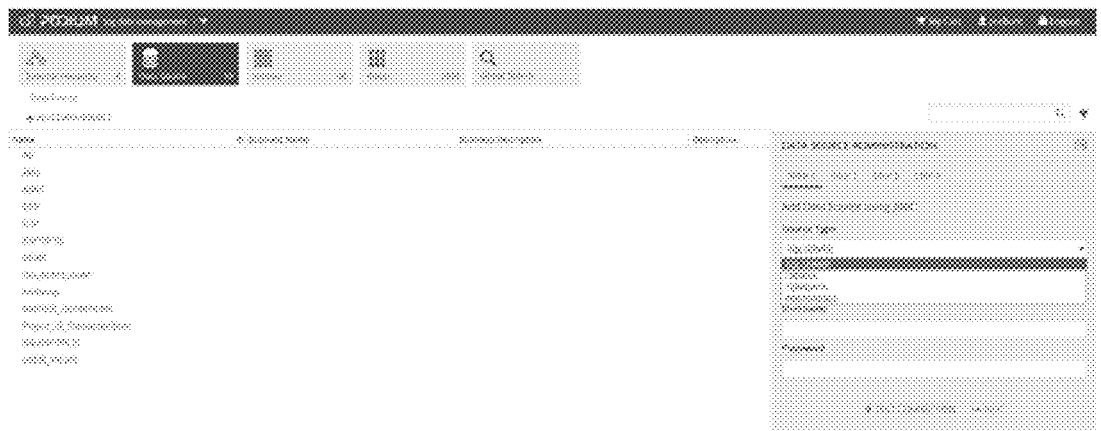
FIG. 6 depicts another display view from the management server interface upon selection of the Data Source tab.
Figures 7, 8:
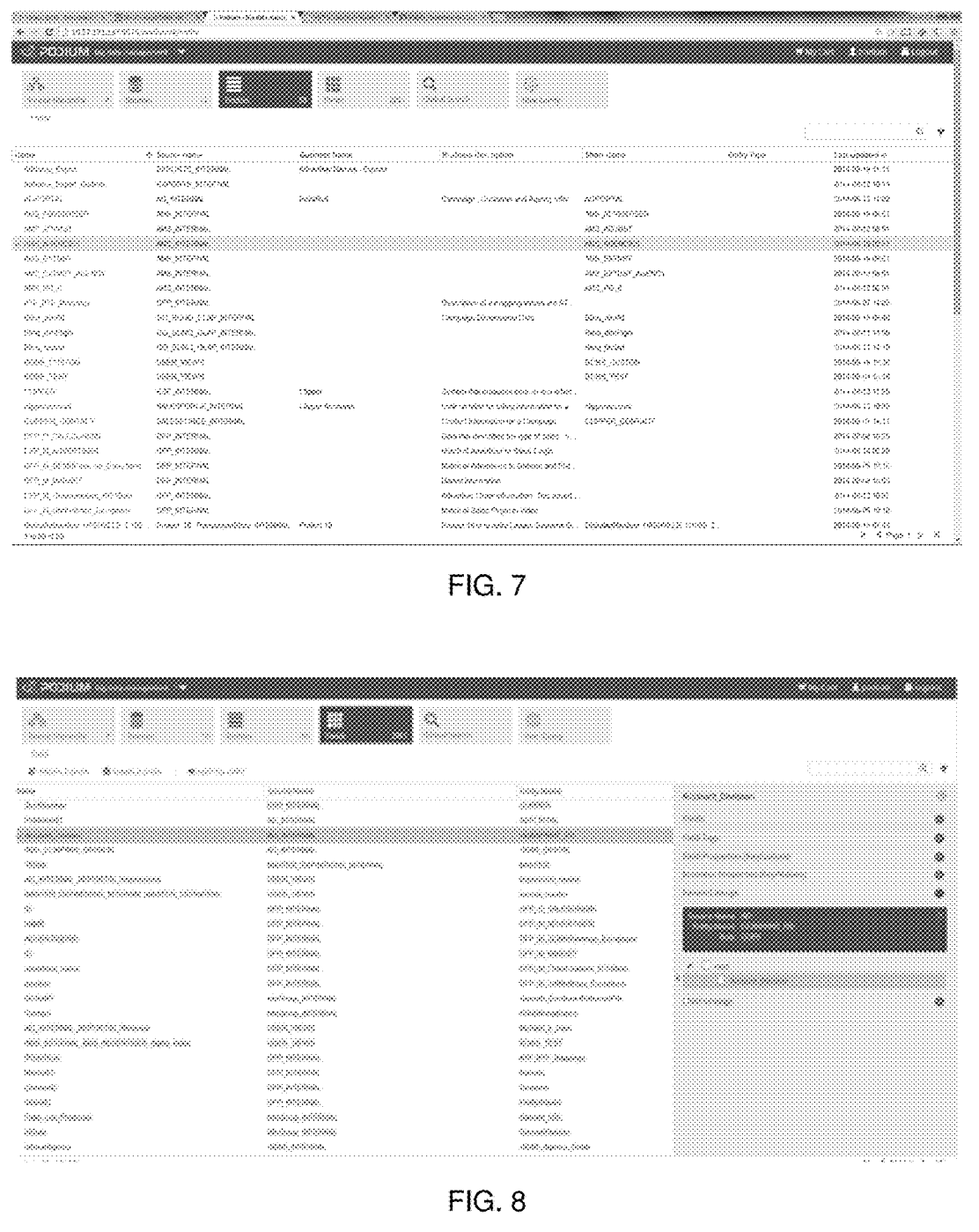

For example, FIG. 5 depicts the UI after the user logs in. The high level navigation available from this display includes, in this example, a Discovery tab 502, a Security tab 504, and a Data Source tab 506. By selecting a tab, the user can navigate to a new page that, in turn, may include one or more other tabs, such as those shown in FIG. 4. By way of example, the Discovery tab (and one or more linked tabs) may be used to identify or specify a data source hierarchy (a logical grouping of data sources), to identify information about a data source and the properties of the source data, to identify information about entities and fields associated with a data source record (as well as properties of attributes associated therewith), and so forth. The Security tab can be used to navigate to pages by which the user can add new users, set security policies and attributes, and so forth. FIG. 6 illustrates a representative page upon selection of the Data Source tab. FIG. 7 illustrates a representative page upon selection of an Entities tab. FIG. 8 illustrates a representative page upon selection of a Fields tab, together with user selection of one of the rows. This latter selection exposes lineage information connecting the view with its data sources. Each such view, and the above are merely representative, is registered in the platform metadata. By navigating through these displays, analysts can use the system to create any number of analysis tables on the route to a final analysis data set. This process also allows users to find and assemble an analysis data set in minutes, documenting the process in the metadata along the way. Analysts can start with pre-defined data sets for subject areas and analytics, then use shop for data to augment and customize them for a specific analysis. Adding new data to an existing analytics data set can be accomplished without requiring IT or database reprogramming.

Figure 9:
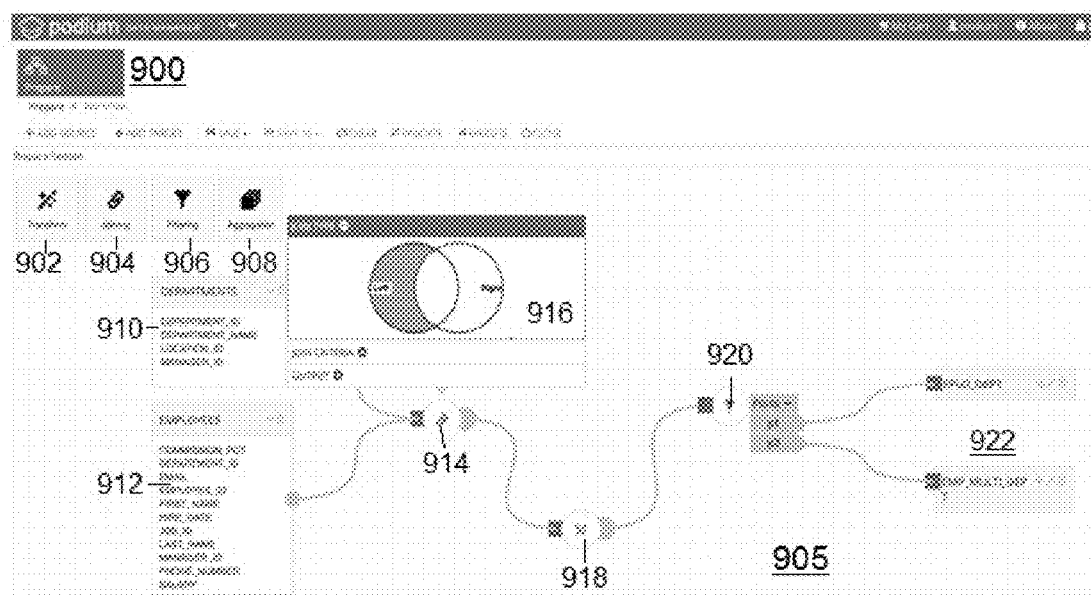
FIG. 9 illustrates a data preparation functionality that provides a data flow interface that enables users to generate custom data sets.

FIG. 9 illustrates a data preparation functionality that provides an intuitive data flow interface that enables even unsophisticated users to create and prepare custom data sets for their own needs. This function is enabled by selected a Prepare tab 900. As illustrated, the Prepare function includes several operators, such as Transform 902, Joining 904, Filtering 906 and Aggregation 908. Preferably, the operators are all supported in a real-time execution flow. This real-time execution flow gives users the ability to interactively create custom data sets by providing real-time feedback during execution. Preferably, this feedback is provided by way of record counts and completion flags throughout the execution graph. This graph also enables users to select sample size data for interactive development performance before executing the data preparation on full datasets. In this example, there are two data sets shown, one for Departments 910, and the other for Employees 912. Here, it is assumed the user want to join these data sets together, and then apply a transform and/or filter. The canvas 905 enables full drop-and-drag functionality. To join the data sets, the user selects the Joining function 904, performs the drag-and-drop to create the join element 914, and configures the input flows using the "Join Type" query box 916. The output of this joinder can then be further configured, e.g., to transform a particular data field (turning all values to upper case) by a transform element 918, with the output thereof then applied through a filter element 920, and so forth, to create the custom data sets 922. Of course, the above-described and illustrated scenario just includes sample data (and data flows), and the particular execution graph may be customized in any desired manner by the user to create the custom data set. Preferably, and as the system populates the designed data set, the user receives visual feedback and can act accordingly (e.g., if the designed data set exhibits some anomaly). This visual feedback may be in the form of a change in color of one or more flow elements, or the like.

Using the discovery function, the user can identify sources, fields and entities, discover properties or attributes (or values thereof), perform global and local searches for objects (including tags, names and descriptions), shop for data, run HIVE-based queries from selected HIVE tables, and so forth.

Preferably, the server uses native Hadoop data formats and structures, and publishes HIVE schema for all files it is managing. This allows a wide variety of third party and open source tools (e.g., SAS, R, Mahout, Datameer, Qlikview, Tableau, and many others) to access and process the data for analysis. It is common that an analysis requires many iterations of data preparation as the analyst refines and clarifies the requirements for the analysis data set. Using the GUI tools, users can rapidly switch between data shopping and data analysis in the platform to support this process. Result data sets created during analysis can be registered in the platform to maintain lineage and business definitions. Preferably, the management server automatically publishes analytical data sets to databases and applications that are not running on the cluster, or runs analytics directly on the same platform.

As users gain insight and findings about the analytical data sources and result sets, they can annotate them in the platform GUI. Preferably, an annotation tab is available on all platform data screens, ensuring that knowledge can be captured "in flight" during analysis. As noted above, these findings form a durable "knowledge network" about the data that increases reuse and standardization.

A high degree of automation allows analysts and developers to rapidly add new data sources to the platform. Once a new data source and its metadata are located, the source typically can be loaded into the platform in minutes or hours (depending on data size and network bandwidth). During the load data quality requirements are checked, data profiling statistics are calculated, data is compressed and encrypted, and HIVE schemas are automatically published. This agility meets the needs of analysts for responding quickly to ad-hoc opportunities and allows an analytic environment to be up and running in days.

The lineage embedded in the platform's metadata allows data preparation and analysis jobs that are developed during discovery to be rapidly migrated to production. By registering the logic developed in HQL, MapReduce, and third party systems, derived data can be recalculate automatically when a source system is updated. Once validated and tested, new metrics, models, and reports can be migrated to production in a short period of time, and without reprogramming.

With metadata to assist finding and preparing data for analysis, the analytics environment provides true self-service and rapid iterations during discovery. As described, the metadata capabilities of the analytics environment provide a self-documenting map to manage data end-to-end. Metadata supports identifying the right data sources, developing analysis sets, managing versions of data sets, and tracing the lineage of data processing and user access. All processes in the analytics environment architecture are tracked in the metadata to automate processing, monitor status, and publish results.

The platform enables source data to be loaded, retained and refreshed in very short time increments (measured in minutes) as compared to prior techniques. Once the data is loaded, the platform metadata tracks the development of re-usable, high quality data sets. Using the interface, users can browse and prepare data sets for analysis. The platform tracks updates, e.g., to business definitions, data lineage, and changes to source system formats. Metadata-driven configuration, development and workflow allow production data sources to be shared by analysts and business processes without high cost or operational risks. Using the system, exploratory data sets can be loaded and analyzed without exposure to production systems. Data and analytical discoveries can be validated rapidly and promoted to production processes without modification or reprogramming.

The platform may be used to create and manage a data lake. Using the platform, all data assets brought into the user's analytic environment are readily available for analysis, and new data sources can loaded efficiently and rapidly. The same data sources staged and managed for production processes can be made available for analytics, without replication or performance impact. Metadata manages access to sensitive data, and preferably all data is encrypted at rest for additional security.

The platform's collaboration capabilities further accelerate analytics. Dynamic tagging, business definitions and observations about data sets and attributes, and the interactive browse and search functions described above allow analysts to share insights and derived data sets. Using the "shop for data" feature, analysts point and click to select data for analysis, and data preparation steps are logged automatically. When another analyst or user wants to know the lineage of a data value (namely, which data sources and calculations created the value), they use the platform to display the sources and see who else is using the data.

The following provides additional details regarding the techniques that may be used to secure data in the platform. Generally, the approach transparently encrypts, encodes and compresses sensitive data without any modification to existing applications using the data. Hadoop-based parallel programs (such as MapReduce) continue to run in parallel, and are accelerated due to the block-based approach implemented in the data protection scheme. This approach herein overcomes the deficiencies of existing software encryption technologies, which conflict with Hadoop's parallel file storage and associated map-reduce processing.

According to an embodiment, the platform implements a particular file format that supports compressing and encrypting data, together with a selectable/pluggable compression mechanism (e.g., GZIP, Snappy, etc.), a selectable/pluggable encryption algorithm (e.g., pluggable through JCA, defaults to AES-128-CBC), a selectable/pluggable digest algorithm (e.g., CRC-32C by default, optional MD5 or SHA-1) to validate data integrity. These tools provide file-level compression/encryption for the data, both at-rest and in-flight. These tools may plug into Hadoop as a MapReduce splittable compression codec. Key management may use customer-provided or supported systems.

A preferred approach herein provides for a file format wrapper around a compressed and encrypted stream. Files conforming to this scheme are or may be decompressed at a block boundary. This enables the Hadoop MapReduce framework to cut the input files into multiple "splits," taking advantage of the cluster's parallel processing model. Thus, the scheme encrypts and compresses HDFS data blocks so that map-reduce jobs execute fully in parallel. Encryption and compression preferably are integrated through standard HDFS interfaces in the platform, and thus no changes are required to existing applications. In operation, the technique computes and stores checksums to verify that compressed and encrypted data are a faithful reproduction of the original data. Ciphers used by the scheme preferably are dependent upon a secure external repository for keys; as noted, preferably an enterprise key management system is used for this purpose. The scheme preferably stores information in blocks, with the block size being in the range 1 Mb-128 Mb. The file format of this scheme preferably contains information about the original file. When available, the original file information which is captured includes: original path name, original file length, original file last modified timestamp in local or some other timezone, processing hostname, and processing timestamp in local or some other timezone.

As has been previously described, platform metadata is generated as the data from a user's data sources are loaded into the system. The platform metadata is built according to a metadata model (or, more generally, a data schema). The metadata schema is built according to a File Definition Language ("FDL") file that describes all of the important information regarding a source of data. This information includes, for example, file layout information (e.g., field by field data type, lengths file format such as fixed length or delimited, etc.) and stores this information as platform metadata. As each new source file is presented to the system, the systems takes the FDL file (which describes the file's format), and populates the metadata. The resulting source system metadata is then parsed and load as Source Information (e.g., Name), Entity Information (e.g., Name, Technical Description, File Glob, Character Set, Record Terminator, Record Type, etc.), and Field Information (e.g., Name, Data Type, Length, etc.). These parsing and loading operations provide the platform the required platform metadata about the file and the fields; this information enables the data to be validated, profiled, loaded, updated, and so forth, as has been previously described.

The nature of the metadata FDL of course will depend on the type of data source.

Loading the platform metadata enables the metadata itself to be browsed, e.g., via the GUI, and it facilitates the back-end processing of the data to facilitates analysis. In particular, users can browse the metadata, namely, information about the source systems, entities and attributes with respect to a particular data set. Using the GUI, users are able to browse from various data sources to entities to attributes, and easily drill from level to level.

The following provides several example use cases for various platform service functions.

For example, assume an employee has been tasked with identifying the correct policy level fields for analysis. The employee knows these fields exist in the source system and has knowledge of the table/entity name. The user logs into the browser-based GUI and decides he wants to browse into the source system and drill to the table level to see if he can find that table. The list of all source systems to which the user has access shows up after the login screen. The user drills into the source system. This opens up a list of all tables that the management server has available from that system. From here, the user recognizes a table with a given name that the user believes might be relevant. He can then drill into the table and gets a list of all attributes associated with that table. Along with the attributes, the platform presents any business definitions, technical names and definitions available. To be sure he has identified the correct fields, the user clicks a button to see a sample of the data from those fields, perhaps along with other fields he has selected for context and linking.

While browsing can be effective, it is also helpful to be able to be able to search on a specific term, a name, or the like. Assume here that the employee is looking for source fields for the claim adjudication tracking system to be implemented. She has the business terms but does not know all the potential source systems that may have the required fields. In this example scenario, she enters "claim open date" in the Search bar. Because system preferably searches across the entire platform metadata, it returns all fields that meet the search criteria. Assume that numerous tables across multiple distinct sources return values. The user can then browse each field and locate the exact one she wants. Then, and to make sure she has the right fields, the user requests sample data for the fields she has identified, plus from additional fields (for context).

As another use case, the platform metadata supports the capture of primary and foreign key relationships between entities. This metadata supports the feature that enables users to select fields from a single or multiple entities to create "user views." These user views are created for querying and extraction of data for use in downstream systems. As an example, assume the user knows he needs 25 fields from a table in a source system for his analysis. He does a search on the table name, is taken to the table, drills on the table to get to the fields names, and selects the 25 fields he needs. He then selects a button to create the user view. He is asked for the name he would like to give his view, he names the view and hits continue. A message comes up saying the view was created successfully. He can then browse the view like any other object.

As another use case, data from a user view can be extracted and saved into a file for downstream use. In particular, data consumers need the ability to extract data from the platform in an easy to use, intuitive manner. The GUI provides functionality to do so via click and save file buttons. In this example, the user has some analysis she needs to do with the source system. The data is available from within the platform. After locating the exact data she needs through the browse and search capabilities, she creates a custom view of the data. After looking at the sample data, she decides it is what she requires. She sets up an extract to run, and the data is either scheduled for extract or extracted in real time. The data is saved in a file on her local machine or in a local "server" file system—based on size.

Data consumers will want to view, add and edit tags and annotations—basically ways to characterize and link the data. This can be used for grouping attributes and searching. As an example, the user is searching and browsing data in the platform. He notices that while most of the data has business definitions and tags, some of them are either incorrect or missing. He then clicks on the edit button and adds, deletes or changes the tags. Within the platform, users can select fields for preparation. This means they can select a field, apply a "value added" filter which may transform that data, and define an output for that field. Also, by default, the platform preferably will apply default processing to external source data to load the data for consumption. A common example is that an external source is a mainframe file.

The above-described use scenarios are merely representative and should not be taken to limit the disclosure.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Without limitation, the metadata repository may be implemented as a PostgreSQL Version 9 data repository. The management server platform services may be implemented in Java Spring. The server GUI may be a thin-client that interfaces to the platform user interfaces, which may be implemented in Apache Tomcat Version 7. The thin-client GUI may communicate to the server via HTTP (e.g., JSON-based RESTful APIs). Hadoop distributions may be Cloudera Version 4+ or HortonWorks Version 2+. Operating systems comprise Linux-CentOS, or Windows. Core libraries are implemented in Java, using Oracle JDK Version 1.6. A Java object persistence layer may be built on Hibernate.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation is software written in a given programming language that runs on a standard Intel hardware platform running an operating system such as Linux. The functionality may be built into any server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP, such as HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The platform functionality may be co-located or various parts/components may be separately and run as distinct functions, perhaps in one or more locations (over a distributed network).

What is claimed is as follows:

1. A data management platform, comprising:
a shared hardware and software infrastructure comprising a distributed file system cluster for data storage; and
a management server operative to receive and manage data from a set of data sources as a data analytics environment, at least one data source of the set of data sources having base metadata associated therewith, the data being stored in the distributed file system cluster, the management server comprising a set of data management platform services to manage the data throughout its lifecycle in the data management platform, the management server operative to generate and maintain platform metadata for use in managing the data across the set of data management platform services, the platform metadata being distinct from the base metadata and comprising information exposed and available to each data management platform service during the lifecycle;
the management server configured to provide in-stream data profiling and data quality exception handling on the information as it is ingested and stored in the distributed file system cluster, the data quality exception handling flagging and holding for analysis any data records having errors or inconsistencies as determined by the associated base metadata;
wherein the data management services include a data shopping component that includes a shopping cart, the data shopping component responsive to receipt of inputs representing data fields being placed in the shopping cart together with receipt of a checkout command to automatically create a view of data associated with the data fields to facilitate a further interactive query, the data fields identifying at least first and second data sources that have distinct source system formats, wherein the view of data integrates data from the first and second data sources without changing source system formats; and
wherein the data management services further include a data preparation component configured during the further interactive query and with respect to the view to receive and process a set of one or more additional commands, thereby creating in real-time a custom data set, the one or more additional commands being one of: a join, a filter, and a transform operation.

2. The data management platform as described in claim 1 wherein the information comprises status information that is one of: data load dates, and data access rights.

3. The data management platform as described in claim 1 wherein the information comprises business and technical format definitions.

4. The data management platform as described in claim 1 wherein the information comprises lineage information.

5. The data management platform as described in claim 1 wherein the information comprises user data that is one of: user rights, access history, and user comment data.

6. The data management platform as described in claim 1 wherein the data management platform services include a load processing service to receive transfer of data from a data source, and to perform a quality control on the transferred data.

7. The data management platform as described in claim 6 wherein the data management platform services include a source processing service to format and profile data received from the load processing service.

8. The data management platform as described in claim 7 wherein the data management platform services include a subject processing service to standardize and transform data received from the source processing service.

9. The data management platform as described in claim 1 wherein the data management platform services include an analytics processing service to format data to facilitate an analysis.

10. The data management platform as described in claim 1 wherein the data management platform services include an access service to enable receipt of a query with respect to the data.

11. The data management platform as described in claim 1 further including a graphical user interface (GUI) that exposes a shop-for-data function, wherein receipt of a selection of the shop-for-data function enables identification of data on which a data analysis is then performed and reported via the GUI.

12. The data management platform as described in claim 11 wherein the interface provides a browse and search function with respect to one of: the data, and the platform metadata.

13. The data management platform as described in claim 11 wherein the GUI provides a browse, search and select function to enable definition of a given subset of the data or platform metadata for analysis.

14. The data management platform as described in claim 13 wherein the interface is operative to create a view of selected data for interactive querying, the view providing a tracking of data lineage that includes data sources and calculations used to create the selected data, the data lineage being displayable upon receipt of a user query.

15. The data management platform as described in claim 13 wherein the interface includes an interactive tool to design a custom data flow.

16. The data management platform as described in claim 12 wherein information identified by the search and browse function is adapted to be tagged to facilitate a subsequent collaboration with respect to the tagged data.

17. The data management platform as described in claim 1 wherein the data management platform services include a data protection service.

18. The data management platform as described in claim 17 wherein the data protection service compresses and encrypts given data, wherein the given data is compressed at a block-based level.

19. The data management platform as described in claim 1 wherein the distributed file system cluster is Hadoop and data received is stored in at least one data lake.

20. The data management platform as described in claim 1 wherein first and second data analytics environments are instantiated by the management server, the first data analytics environment associated with a first enterprise, and the second data analytics environment associated with a second enterprise distinct from the first enterprise.

* * * * *